Patented Nov. 10, 1953

2,658,901

UNITED STATES PATENT OFFICE 2,658,901

PINYL THIOPHENE

George C. Johnson, Woodbury, N. J., assignor to Socony-Vacuum Oil Company, Incorporated, a corporation of New York No Drawing. Application March 19, 1948,
Serial No. 15,969

4 Claims. (Cl. 260—329)

The present invention relates to the condensation of two compounds each of which readily polymerizes and, more particularly, to the condensation of thiophene and terpenes.

The suggestion that thiophene and benzene are similar and closely related has been made many times in the past. However, it would appear that under many conditions thiophene does not react in a manner analogous to that in which benzene reacts under the same conditions. For example, it is well-known that benzene can be alkylated by olefins and alcohols in the presence of such catalysts as sulfuric acid, boron trifluoride complexes such as boron trifluoride-dimethyl ether complex, hydrogen fluoride, and the metal halides, aluminum chloride, ferric chloride and stannic chloride. On the other hand, Kutz and Corson in a paper published in "Journal of the American Chemical Society" for August 1946 (pages 1477 to 1479) make the following statement:

"An alumina-silica type catalyst (Filtrol X-143) proved to be satisfactory for the alkylation of thiophene. Phosphoric acid can also be used, but other typical alkylation catalysts were found to be unsatisfactory, e. g., aluminum chloride, ferric chloride, stannic chloride, hydrogen fluoride, boron trifluoride-dimethyl ether complex, and sulfuric acid."

Thus, it is evident that in the alkylation reaction thiophene does not behave as does benzene. This opinion is further strengthened by the following experience.

United States Patent No. 2,141,611 was issued December 27, 1938 to Boris Malishev. While the specific illustrative examples are restricted to the alkylation of benzene by ethylene and isobutylene, to the alkylation of a petroleum distillate high in aromatic hydrocarbons with ethylene and similar alkylations involving aromatic hydrocarbons and olefins using $P_2O_5$ as a catalyst, the patentee states:

"Some of the heterocyclic organic compounds, such as analogues and/or homologues of pyridine, quinoline and thiophenes may also be looked upon as having cyclic nuclei capable of being alkylated by the method of this invention."

Nevertheless, Malishev's suggestion does not provide a solution to the problem of obtaining useful compounds by the reaction of two easily polymerizable materials such as thiophene and a terpene. This is manifest from the following test of Malishev's suggestion that thiophene may be substituted for benzene.

Malishev's experimental conditions as given in Example II of United States Patent No. 2,141,611 were employed except that thiophene was substituted for benzene and alpha-pinene for ethylene. Malishev used 5.4 mols of isobutylene, 10 mols of benzene, 25 grams of lampblack, 50 grams of phosphorus pentoxide ($P_2O_5$) and 10 grams of cresol. For comparison each reactant was used in the proportion recommended by Malishev but the total quantities used were reduced to one-fourth that used by Malishev, consequently, 1.35 mols of alpha-pinene, 2.5 mols of thiophene, 6.25 grams of lamp black, 12.5 grams of phosphorus pentoxide and 2.5 grams of cresol were mixed. The mixture was heated to 250° C. for 15 minutes as directed by Malishev.

Of the 415 grams of reactants introduced into the stirring autoclave, only 284 grams (about 69 per cent) could be poured out at the end of the reaction time, the remaining 31 per cent being coke which had to be scraped out. The pourable material, a dark green viscous oil, was washed with water and dilute alkali to remove the catalyst and was separated into fractions by distillation. These fractions consisted of a low boiling fraction, pinyl thiophene, a viscous oil and asphalt. A material balance for the run is given in Table I.

TABLE I

| In | | | Out | |
|---|---|---|---|---|
| | Grams | Mols | | Grams |
| Pinene | 183.75 | 1.35 | Low boiling liquid | 29 |
| Thiophene | 210.0 | 2.5 | Pinyl thiophene | 21 |
| Lampblack | 6.25 | | Viscous oil | 139 |
| $P_2O_5$ | 12.5 | | Asphalt | 50 |
| Cresol | 2.5 | | Coke | 131 |
| | | | Alkali soluble material and handling loss | 45 |
| | 415.00 | | | 415 |

The pinyl thiophene was analyzed and found to contain 14.1 per cent sulfur. The theoretical sulfur content of pinyl thiophene is 14.55 per cent.

The theoretical yield of pinyl thiophene from 183.75 grams of alpha-pinene, the reactant present in the smaller molecular quantity, is 297 grams. Therefore, the yield of 21 grams represents 7.1 per cent of theoretical.

The viscous oil, asphalt and coke appeared to be composed primarily of polymers of pinyl thiophene, of polymers of pinene and of polymers of thiophene together with decomposition products.

The foregoing run was repeated except that a lower temperature not exceeding 115° C. was used. That is to say, 183.75 grams of alpha-pinene, 210 grams of thiophene, 6.25 grams of lampblack, 2.5 grams of cresol and 12.5 grams of phosphorus pentoxide were mixed. The reaction was initiated at 25° C., the mixture heated to reflux temperature and refluxed for four hours. The reaction temperature rose from 86° C. to 115° C. during the four-hour period. At the end of the reaction period, the reaction product was washed with aqueous dilute alkali and the oil-aqueous mixture was filtered to remove the lamp black and any other solids. The two layers were separated and 339 grams of oil layer recovered. The recovered oil was fractionated. A material balance for this reaction at the lower temperature, excluding the lamp black, is given in Table II.

TABLE II

| In | | | Out | |
|---|---|---|---|---|
| | Grams | Mols | | Grams |
| Alpha-pinene | 183.75 | 1.35 | Low boiling liquids | 98 |
| Thiophene | 210.0 | 2.5 | Pinyl thiophene | 148.5 |
| $P_2O_5$ | 12.5 | | Viscous oil | 70 |
| Cresol | 2.5 | | Losses and alkali soluble | 92.25 |
| | 408.75 | | | 408.75 |

The pinyl thiophene contained 14.1 per cent sulfur and the yield of pinyl thiophene was 50 per cent based on the alpha-pinene.

For comparison alpha-pinene and thiophene were reacted under the novel conditions set forth hereinafter with the following material balance.

TABLE III

| In | | | Out | |
|---|---|---|---|---|
| | Grams | Mols | | Grams |
| Alpha-pinene | 544 | 4 | Low boiling liquid | 512.5 |
| Thiophene | 420 | 5 | Pinyl thiophene | 367 |
| Acid (catalyst) | 100 | | Viscous oil | 18 |
| | | | Acid layer | 102 |
| | | | Losses | 64.5 |
| | 1,064 | | | 1,064 |

The pinyl thiophene fraction was analyzed and found to contain 14.2 per cent sulfur.

The difference in results obtained following Malishev's directions exactly, using a modified form of Malishev's directions and when carrying out the reaction in accordance with the principles of the present invention is obvious from an inspection of the data given in Table IV.

TABLE IV

| Run | Malishev (A) | Modified Malishev (B) | Applicant |
|---|---|---|---|
| Temperature °C | 250 | 86–115 | 90–95 |
| Yield of pinyl thiophene (wt. per cent of theoretical) | 7.1 | 50.0 | 41.7 |
| Wt. percent of condensed material which is pinyl thiophene | 6.2 | 68.0 | 95.3 |
| Wt. percent of condensed material which is higher boiling, i. e., polymers | 93.8 | 32.0 | 4.7 |

The principal significant figures are those given in the last line of Table IV. The data given under Malishev (A) are indicative of results so unsatisfactory as to require no discussion. However, a comparison of the data of Malishev (B) and of applicant leads to the following conclusion. The theoretical yield of pinyl thiophene in both cases is about the same. On the other hand, the losses due to polymerization and decomposition are much greater, roughly 6.8 times as much, under Malishev's modified conditions as under the conditions set forth hereinafter. In other words, far more of the unreacted original reactants can be recovered for re-use under the conditions set forth hereinafter than can be recovered even when using a modification of the conditions described by Malishev which provides a set of much milder conditions than suggested by Malishev. In other words, under the conditions set forth hereinafter practically all of the original reactants which enter into the reaction is recovered as a useful product whereas even under the mild conditions of the modified Malishev method 32 per cent of the original reactants which take part in the reaction is recovered as useless material. This can be stated more specifically as follows: under the conditions set forth in Malishev's patent about 15.2 parts by weight of useless material, i. e., asphalt, coke and unwanted viscous oils, are produced for each part by weight of pinyl thiophene; lowering the reaction temperature 135 to 165° C. but making no other change in the conditions results in the production of about 0.47 parts by weight of useless material for each part by weight of pinyl thiophene; using the conditions set forth hereinafter, only about 0.05 part by weight of viscous oils is produced for each part by weight of pinyl thiophene. The foregoing can be tabulated as follows as a ratio of useful material (pinyl thiophene) to useless materials (polymers).

| Malishev A | Malishev B | Applicant |
|---|---|---|
| $\dfrac{\text{Pinyl thiophene+}}{\text{useless material*}} = \dfrac{1}{15.2} = 0.066$ | $\dfrac{1}{0.47} = 2.1$ | $\dfrac{1}{0.05} = 20$ |

*Polymer.
+Containing the residue of one molecule of pinene and the residue of one molecule of thiophene.

Under the conditions set forth hereinafter no asphalt or coke is formed and substantially all of the reaction mixture which is not the desired pinyl thiophene can be recycled. Ultimately 95.3 weight per cent of the condensed material is the desired pinyl thiophene while under the modified Malishev conditions only about 68 weight per cent of the condensed material is the desired pinyl thiophene. Thus, it is apparent that the oft repeated statement that thiophene resembles benzene very closely has little, if any, basis in alkylation reactions. The greatest difference which is easily discernable is the ease with which thiophene polymerizes as compared to the resistance to polymerization possessed by benzene.

Thus, it is apparent that reaction conditions under which apparently satisfactory results are obtained when the reactants are not readily polymerized are not suitable for reactions involving one readily polymerized reactant such as thiophene or mono- or poly- alkylated thiophene having at least one unsubstituted alpha position or mono- or poly- acylated thiophene having at least one unsubstituted alpha position or other substituted thiophenes having at least one unsubstituted alpha position and a second readily polymerized reactant such as a terpene or a diolefine; for example, alpha pinene, beta-pinene, di-pentene and similar terpenes or commercial products composed largely of the terpenes, such as gum turpentine, wood turpentine or technical dipentene or diolefines such as hexadiene-1,5.

Since for practical reasons it is of the utmost importance that the portion of the reactants which does not participate in the formation of the 1:1 compound be recovered for recycling, a practical, industrially useful method of producing 1:1 compounds requires a catalyst and operating conditions under which the production of polymers of the 1:1 compound, of polymers of the terpene or diolefine, i. e., bifunctional hydrocarbon and of polymers of thiophene is reduced to a minimum or substantially avoided. These ends are attained by the method described hereinafter.

Broadly stated it has been found that compounds containing one molecular equivalent of the residue of a diolefine or a terpene to one molecular equivalent of the residue of thiophene or a derivative of thiophene can be prepared by reacting one mole of each reactant in the presence of a catalyst which does not catalyze the polymerization of thiophene. While it has been found that the order of addition of the reactants and catalyst appears to have little effect upon the production of undesired products, at times it is desirable to mix the thiophene reactant and the catalyst and add the other reactant, i. e., diolefine or terpene slowly with effective agitation at such a rate that at any given time the amount of diolefine or other readily polymerized reactant in the mixture is low. For example, the terpene or diolefine may be introduced into the reaction mixture at a plurality of points whilst the reaction mixture is vigorously agitated.

Typical of the terpenes which by this means react with thiophene or thiophene derivatives having at least one unsubstituted nuclear alpha position are alpha-pinene, beta-pinene and dipentene (limonene), gum turpentine, wood turpentine, technical dipentene and the like.

At this point it should be emphasized that while the two turpentines, gum turpentine and wood turpentine, differ somewhat in composition, either may be used. As Palmer disclosed in "Ind. Eng. Chem." 34, 1028 (1942) gum turpentine has the following composition:

|  | Per cent by weight |
|---|---|
| Alpha-pinene | 58–65 |
| Beta-pinene (nopinene) | 30 |
| Mono-cyclic terpenes | 2 |
| Terpene alcohols | 2 |

On the other hand, wood turpentine has the following composition:

|  | Per cent by weight |
|---|---|
| Alpha-pinene | 80 |
| Beta-pinene (nopinene) | trace |
| Mono-cyclic terpenes | 15 |
| Terpene alcohols | 1.5 |

The accepted structural formulae of the primary constituents of the two turpentines are:

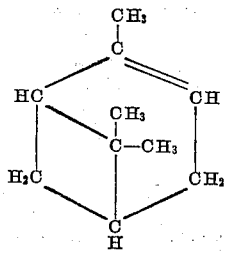
Alpha-pinene $C_{10}H_{16}$

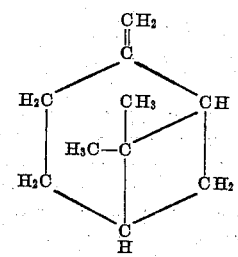
Beta-pinene (nopinene) $C_{10}H_{16}$

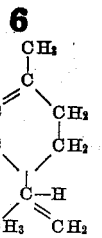
Dipentene (limonene) $C_{10}H_{16}$

At the outset it is desirable to emphasize that dicyclic terpenes closely resemble the diolefines in that like the diolefines the dicyclic terpenes contain not one active structure, as do olefins, but two active structures, one of these is a double bond as in ordinary olefins and the other a four-membered ring which opens readily.

The diolefine-like structure of the dicyclic terpenes makes it possible to form structures in which a single terpene group is connected to two thiophene rings thereby producing a material in which the molecular equivalents of terpene and thiophene are in the ratio of 1:2 and not in the desired ratio of 1:1. The formation of such 1:2 compounds is readily illustrated by reference to pinene which has the structural formula

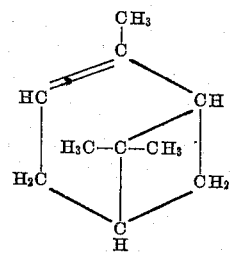
Alpha-pinene

Alpha-pinene can react with thiophene to produce a compound containing two thiophene rings for each pinene molecule, i. e., having a molecular ratio of one pinene to two thiophene residues and having a structure represented by the following:

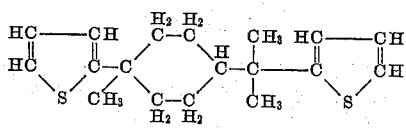

The formation of an analogous compound from a mono-olefin such as isobutene is impossible for when the tertiary butyl thiophene

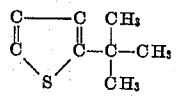

has been formed it is not possible to link another thiophene residue to the alkyl group by any alkylation reaction as that term is conventionally interpreted.

The fact that mono-olefins do not react with a second thiophene molecule distinguishes from the diolefines and terpenes and eliminates one difficulty which is a constant source of trouble when trying to produce compounds containing the residue of one molecule of a terpene or diolefine and one molecule of thiophene or thiophene derivatives having at least one unsubstituted nuclear alpha poistion.

The reaction between a diolefine or a terpene and thiophene or a thiophene derivative as defined hereinbefore, to produce a compound containing one molecular equivalent of each cannot be catalyzed by such well-known catalysts as sulfuric acid, aluminum chloride, boron trifluoride, boron trifluoride in conjunction with dihydroxy-fluoroboric acid or hydrogen fluoride because the products are viscous oils, resins or tars and not compounds such as pinyl thiophene. Catalysts aluminum chloride, boron trifluoride in conjunction with dihydroxyfluoroboric acid, the complex of one mole of boron trifluoride with one mole of water, suitable for the alkylation of thiophene with mono-olefins, such as isobutene, are not in general suitable for catalyzing the reaction of a terpene or a diolefine with thiophene or a thiophene derivative of the class defined hereinbefore to produce a compound containing the residue of one molecule of the terpene or the like and the reidue of one molecule of the thiophene or thiophene derivative. Only those catalysts which do not polymerize thiophene when mixed with thiophene and heated at 80° C. for one or two hours are suitable. Accordingly, the present invention provides a method for reacting diolefines or bifunctional hydrocarbons with thiophene or thiophene derivatives having at least one unsubstituted nuclear alpha position in the presence of a catalyst which does not polymerize thiophene substantially when mixed with thiophene and held at 80° C. for not more than two hours. This class of catalysts includes phosphoric acid of 85 per cent concentration, (as distinguished from phosphorus pentoxide) boron trifluoride in the presence of large amounts of water, i. e., greater than that present in the lower hydrates, boron trifluoride hydrate, $BF_3 \cdot 4H_2O$ and the higher hydrates, boron trifluoride-ethyl ether complex and other boron trifluoride complexes which do not polymerize thiophene to an appreciable extent when mixed therewith and held at 80° C. for not more than two hours.

Illustrative of the reaction between thiophene or a thiophene derivative having at least one unsubstituted nuclear alpha position and a bifunctional hydrocarbon such as a terpene are the following illustrative examples.

*Example I*

Alpha-pinene, thiophene and 85 per cent phosphoric acid were mixed in the proportion of about 544 parts by weight of alpha-pinene (about 4 mols), about 420 parts by weight of thiophene (about 5 mols) and about 100 parts by weight of 85 per cent phosphoric acid. The reaction mixture was agitated vigorously and heated to reflux, i. e., 90°-95° C. The mixture was held at the reflux temperature for about two hours. At the end of the reaction period, the reaction mixture was cooled to 40° C. and the acidic layer separated. The oily layer was water-washed twice and distilled into three fractions, (1) materials boiling below the boiling point of pinyl thiophene, (2) pinyl thiophene, i. e., pinene-thiophene compound containing one molecule of pinene and one molecule of thiophene and (3) viscous oil. The pinyl thiophene fraction was analyzed and found to contain 14.2 per cent sulfur. The theoretical sulfur content of pinyl thiophene is 14.55 per cent. The yield based on alpha-pinene was 41.7 per cent with a loss of 4.7 weight per cent of polymers in the form of viscous oil boiling above the boiling point of the pinene-thiophene compound containing one molecular equivalent of thiophene and one molecular equivalent of the bifunctional hydrocarbon.

*Example II*

Thiophene and 85 per cent phosphoric acid in the ratio of 84:30 parts by weight were mixed and stirred together at 80° C. in a closed container. Gum turpentine was added at the rate of 9 parts by weight per minute until about 136 parts by weight had been added. Thereafter the reaction mixture was stirred for an additional 30 minutes. The acid layer was separated from the hydrocarbon layer and the hydrocarbon layer was washed twice with water, then with diluted aqueous sodium hydroxide solution and again with water. The light-brown oil which was recovered was distilled under reduced pressure. The pinyl thiophene fraction boiled at 160°-165° C. at a pressure of 24-27 millimeters of mercury equivalent to 280° to 290° C. at atmospheric pressure. The material had a specific gravity of 60° F. of 1.001 and a refractive index $n_D^{20}=1.5318$. The material contained 13.2 per cent sulfur compared to a theoretical sulfur content of 14.55 per cent for $C_{14}H_{20}S$. This indicates that the fraction was impure and contained sufficient impurity so that the average number of moles of pinene per mole of thiophene was 1.16.

*Example III*

Thiophene and 85 per cent phosphoric acid were mixed in the proportion of about 5 moles of thiophene to about 100 parts by weight of the phosphoric acid and placed in a closed container. The mixture was heated to 80° C. and about 4 moles of alpha-pinene added at the rate of about 4.5 parts by weight per minute during about two hours. Thereafter the entire mixture was stirred for a short period. Ten minutes was found to be sufficient. The reaction mixture was cooled to below 50° C. (This was for ease in handling.) The acid layer was separated from the hydrocarbon layer and the hydrocarbon layer washed twice with water, then with dilute aqueous ammonia and then twice with water to which sufficient n-butanol had been added to suppress the formation of emulsions. A light-yellow oil was recovered. The light-yellow oil was distilled to remove unreacted thiophene, water, n-butanol and some unreacted alpha-pinene. The residue was distilled under reduced pressure to remove the remainder of the unreacted alpha-pinene and to recover as a distillate a fraction boiling at 142-144° C. at a pressure of 8 millimeters of mercury.

The fraction boiling at 142-144° C. at a pressure of 8 millimeters of mercury had a specific gravity at 60° F. of 1.0056 and a refractive index of $n_D^{20}=1.5340$; a kinematic viscosity at 100° F. of 5.32 centistokes and at 210° F. of 1.51 centistokes. The sulfur content was 14.49 per cent as compared with 14.55 per cent for the compound $C_{14}H_{20}S$. The material remained liquid when cooled in a bath of solid carbon dioxide and crystallized when cooled in a bath of liquid nitrogen.

The foregoing examples establish that two readily polymerized hydrocarbons, to wit: a bifunctional hydrocarbon of diolefinic-like structure, i. e., diolefines and terpenes such as, alpha-pinene, beta-pinene, dipentene and similar terpenes and commercial products composed largely of terpenes such as gum turpentine, wood turpentine and technical dipentene, hexadiene-1, 5, and similar diolefines and thiophene or derivatives of thiophene having at least one unsubstituted nuclear alpha position such as, 2-methyl thiophene, 3-methylthiophene, 2-tertiary butyl thiophene, 2-isopropyl-thiophene, 2-s-octyl thiophene, 2-acetyl-thiophene, 2-chlorothiophene, but not 2,5-di-tertiary-butyl thiophene nor 2-chloro-5-methyl thiophene or the like are reacted in the presence of an alkylation catalyst which does not polymerize thiophene to a substantial extent when mixed therewith and maintained at about 80° C. for not more than two hours to produce condensation products of the nature of pinyl thiophene in which the mol ratio of each residue to the other is about 1:1.

The condensation products produced in accordance with the process of the present invention, being similar to certain of the products described in my application Serial Number 668,322, filed May 8, 1946, and issued as U. S. 2,490,270 on December 6, 1949, may be used, as shown in said patent, as adhesives, as additives for lubricating oils, and the like.

I claim:

1. The method for producing condensation products from terpenes and an alkylatable thiophene, said products containing one thiophene ring for each terpene molecule, which comprises reacting a terpene and an alkylatable thiophene having at least one unsubstituted nuclear alpha position in the presence of a liquid condensation catalyst consisting essentially of 85 per cent phosphoric acid, maintaining the temperature of said reaction at not greater than about 120° C., and separating a condensation product containing about one thiophene radical for each terpene radical.

2. The method as set forth and described in claim 1 wherein the terpene is alpha-pinene.

3. A method of producing, from readily polymerizable materials, condensation products, a molecule of which contains the residue of one molecule of each of the reactants, which comprises mixing thiophene with a terpene, and an effective amount of 85 per cent phosphoric acid to form a reaction mixture, holding said reaction mixture at a temperature not greater than 120° C., and separating a condensation product having about one thiophene ring and about one molecular equivalent of said terpene per molecule of condensation product.

4. A method of producing, from readily polymerizable materials, condensation products, a molecule of which contains the residue of one molecule of each of the reactants, which comprises mixing thiophene with alpha pinene and an effective amount of 85 per cent phosphoric acid to form a reaction mixture at a temperature not greater than 120° C., and separating a condensation product having about one thiophene ring and about one molecular equivalent of said alpha pinene per molecule of condensation product.

GEORGE C. JOHNSON.

References Cited in the file of this patent

UNITED STATES PATENTS

| Number | Name | Date |
|---|---|---|
| 1,939,932 | Thomas | Dec. 19, 1933 |
| 2,141,611 | Malishev | Dec. 27, 1938 |
| 2,145,369 | Osterhof | Jan. 31, 1939 |
| 2,396,144 | Anderson | Mar. 5, 1946 |
| 2,429,575 | Appleby | Oct. 21, 1947 |
| 2,490,270 | Johnson | Dec. 6, 1949 |
| 2,570,542 | Gerald | Oct. 9, 1951 |

OTHER REFERENCES

Katz and Corson, J. Am. Chem. Soc. 68, 1477 (1946).